(12) United States Patent
Lataille et al.

(10) Patent No.: US 10,657,449 B2
(45) Date of Patent: May 19, 2020

(54) SYSTEM AND METHOD FOR LOAD DISTRIBUTION IN A NETWORK

(71) Applicant: Amadeus S.A.S., Biot (FR)

(72) Inventors: Norbert Lataille, Le Cannet (FR); Alexandre Sbragia, Chateauneuf de Grasse (FR); Renaud Arnoux-Prost, Dallas, TX (US); Eric Bousquet, Antibes (FR); David Renaudie, Valbonne (FR)

(73) Assignee: AMADEUS S.A.S., Biot (FR)

( * ) Notice: Subject to any disclaimer, the term of this patent is extended or adjusted under 35 U.S.C. 154(b) by 1083 days.

(21) Appl. No.: 14/430,274

(22) PCT Filed: Sep. 26, 2013

(86) PCT No.: PCT/EP2013/002897
§ 371 (c)(1),
(2) Date: Mar. 23, 2015

(87) PCT Pub. No.: WO2014/048572
PCT Pub. Date: Apr. 3, 2014

(65) Prior Publication Data
US 2015/0286944 A1     Oct. 8, 2015

Related U.S. Application Data (63) Continuation of application No. 13/628,487, filed on Sep. 27, 2012, now Pat. No. 9,031,891.

(30) Foreign Application Priority Data

Sep. 27, 2012   (EP) .................................. 12368026

(51) Int. Cl.
  *G06N 5/04*      (2006.01)
  *G06N 20/00*     (2019.01)
  (Continued)

(52) U.S. Cl.
  CPC ............. *G06N 5/045* (2013.01); *G06N 20/00* (2019.01); *G06Q 10/02* (2013.01); *G06N 7/005* (2013.01)

(58) Field of Classification Search
  CPC ........ G06N 5/045; G06N 7/005; G06N 20/00; G06Q 10/02
  See application file for complete search history.

(56) References Cited

U.S. PATENT DOCUMENTS 5,057,992 A   10/1991   Traiger
5,839,114 A   11/1998   Lynch et al.
(Continued)

OTHER PUBLICATIONS

De Mello, Rodrigo Fernandes, and Luciano Jose Senger. "A new migration model based on the evaluation of processes load and lifetime on heterogeneous computing environments." Computer Architecture and High Performance Computing, 2004. SBAC-PAD 2004. 16th Symposium on. IEEE, 2004. (Year: 2004).*

(Continued)

*Primary Examiner* — Miranda M Huang
*Assistant Examiner* — Kevin W Figueroa
(74) *Attorney, Agent, or Firm* — Thompson Hine LLP (57) ABSTRACT

A computer-implemented reservation method and a corresponding system are utilized for controlling execution of a decision process to maintain data access efficiency upon receipt of a computation inquiry. The method comprises associating to a computer backend machine a configuration file containing at least a decision rule that drives the decision process and that is computed at least from a current value of a statistical indicator and a target value of the statistical indicator; periodically obtaining an updated value of the statistical indicator; upon detection that the updated value is differing from the target value, dynamically updating the configuration file and storing in real-time a recomputed decision rule in the configuration file.

15 Claims, 6 Drawing Sheets

(51) Int. Cl.
*G06Q 10/02* (2012.01)
*G06N 7/00* (2006.01)

(56) References Cited

U.S. PATENT DOCUMENTS

| | | |
|---|---|---|
| 6,490,615 B1 | 12/2002 | Dias et al. |
| 2005/0120095 A1 | 6/2005 | Aman et al. |
| 2006/0143703 A1* | 6/2006 | Hopen ................ G06F 21/6218 726/15 |
| 2007/0055555 A1 | 3/2007 | Baggett et al. |
| 2008/0098101 A1 | 4/2008 | Black et al. |
| 2008/0208961 A1 | 8/2008 | Kim et al. |
| 2008/0235225 A1* | 9/2008 | Michele ................ G06F 21/10 |
| 2009/0222562 A1 | 9/2009 | Liu et al. |
| 2009/0254707 A1 | 10/2009 | Alstad |
| 2011/0167034 A1* | 7/2011 | Knight ............. G06F 17/30312 707/602 |
| 2011/0172830 A1* | 7/2011 | Milder ................ F24D 19/1009 700/277 |
| 2012/0166645 A1* | 6/2012 | Boldyrev .............. G06F 9/5083 709/226 |
| 2013/0013351 A1* | 1/2013 | Cholak ................ G06Q 10/08 705/5 |

OTHER PUBLICATIONS

European Patent Office, International Search Report issued in International Application No. PCT/EP2013/002897 dated Dec. 4, 2013.
USPTO, final Office Action issued in U.S. Appl. No. 13/628,487 dated Feb. 5, 2015.
USPTO, Office Action issued in U.S. Appl. No. 13/628,487 dated Jul. 31, 2014.
European Patent Office, Search Report received in European application No. 12368026.6 dated Feb. 13, 2013.
Aweya, et al., "An adaptive load balancing scheme for web servers", International Journal of Network Management 2002 vol. 12, No. 1, Jan. 1, 2002, pp. 3-39.
Canadian Intellectual Property Office, Official Action issued in Application Serial No. 2,884,091 dated Jun. 25, 2019.

\* cited by examiner

SYSTEM AND METHOD FOR LOAD DISTRIBUTION IN A NETWORK

TECHNICAL FIELD

The present invention relates generally to data and information processing for computer-implemented database systems and, more particularly, relates to a computer-implemented reservation system and method utilized for providing availability information in a travel reservation and booking system, such as travel seats, in connection with service resources. More precisely, the invention addresses the real-time decision for driving task executions by a source of data; for instance, choosing one among a plurality of data sources storing availability information data relevant to the availability requests and using inventory links to their optimal capacity, and thus providing a high availability service while using data sources of a lower reliability. In addition, the invention can also reduce failures in retrieving data from a data source and dynamically monitor and maintain the high efficiency of data access to an availability cache source when a data sync process is being executed.

BACKGROUND

A computerized travel system is organized around a Global Distribution System GDS being accessed by travel vendors such as travel agencies, online travel vendors and travel companies. The GDS system may be a proprietary computer system allowing real-time access to airline fares, schedules, and seating availability and other data.

The GDS system implements an access to various data sources in order to provide availability information. The accessed data sources may be remote from the GDS system. They may be data sources provided by airlines. To retrieve availability information, an inventory source can be accessed by polling while other data sources are accessible in parallel in order to reduce the polling bandwidth, save costs (inventory database's accesses are more expensive) and cut off response time as often as possible.

A challenge is to quickly react to a rapid variation such as a growth of computation inquiries or a crisis (like a polling outage) and meanwhile to maintain the data access efficiency of data sources. It leads to technical constraints involving routing decisions between various sources where data relevant to reply to an availability request are potentially stored. System must then decide in which case it is more appropriate to use an AVS (availability status source) or a cache data source.

James Aweya et al. disclose in "An adaptive load balancing scheme for web servers", International Journal of Network Management, vol. 12, no. 1, 1 Jan. 2002, pages 3-39 an admission control function in a web switch combined to a load balancing scheme for routing incoming requests to a plurality of web servers. The web servers periodically send server health status information to the web switch.

SUMMARY

In one example of embodiment, a method is disclosed for controlling the execution of a decision process by a computer backend machine of a computer network upon receipt of a computation inquiry, comprising:
  associating to the computer backend machine a configuration file containing at least a decision rule that drives the decision process and that is computed at least from a current value of a statistical indicator and a target value of the statistical indicator;
  periodically obtaining an updated value of the statistical indicator;
  upon detection that the updated value is differing from the target value, dynamically updating the configuration file which further comprises:
    re-computing the decision rule using the updated value as new current value;
    storing in real-time the re-computed decision rule in the configuration file.

The decision rule may be a rule deciding which data source is accessed based on request-specific input parameters (originator, origin & destination . . . ). The decision rule may also be a rule deciding whether an update of a cache data source is to be performed.

The statistical indicator can be indicative of a data access to one or more data sources. This may be a write access. This may be a read access.

The method may be implemented in a GDS system. The accessed data sources may be data sources from different airlines or other companies.

The computation inquiry may come from a private person or a travel agency. Both may use a computer frontend machine to send the computation inquiry.

The computer backend machine may be part of a Global Distribution System GDS.

In another example of embodiment, a computerized system comprises at least one computer backend machine configured to execute a decision process upon receipt of a computation inquiry and comprising a configuration file containing at least a decision rule that drives the decision process and that is computed at least from a current value of a statistical indicator and a target value of the statistical indicator, the computer backend machine comprising a processor where operation of the processor in accordance with a computer program stored in a non-transitory computer-readable medium causes the computerized system to:
  periodically obtaining an updated value of the statistical indicator;
  upon detection that the updated value is differing from the target value, dynamically updating the configuration file which further comprises:
    re-computing the decision rule using the updated value as new current value;
    storing in real-time the re-computed decision rule in the configuration file.

Potential advantages of the present invention are:
Maintaining a high quality of service by choosing an appropriate target data source from several data sources including relatively low-reliable ones;
Optimally using the data sources and their storage capacity;
Following and maintaining the contractual agreements, such as Service Level Agreements (SLA).

The exemplary embodiments also encompass a non-transitory computer-readable medium that contains software program instructions, where execution of the software program instructions by at least one data processor results in performance of operations that comprise execution of the method of the present invention.

BRIEF DESCRIPTION OF THE DRAWINGS

The foregoing and other aspects of the embodiments of the present invention are made more evident in the following Detailed Description, when read in conjunction with the attached Figures, wherein.

DETAILED DESCRIPTION

Although the following description is given in the context of an application to the airline industry, it does not represent a limiting example since the present invention is applicable to all sorts of travel and tourism products such as rooms, car rental, railways tickets or the like.

Before the introduction of the present invention, certain terms used in the following description are defined as follows:

Availability: This is the number of seats available for sale. It is used to accept or deny further bookings.

Sources of availability information: this comprises all kinds of data repositories where information connected to travel product availability are stored.

Inventory source: a source of availability information which has the best accuracy since it reflects the actual status of the bookings made for travel products the inventory is comprised of. In typical cases, the inventory is based at the travel carrier side.

Base availability source: a source of availability information which derives from the inventory source. It is often used at a GDS system side to prevent systematic access to the inventory source and save bandwidth consumption. Such data source type, also called AVS is periodically updated from the inventory source and is a simplified version of the inventory source. In term of data quality, the data sources rated according to a high, fair, or low confidence level are respectively listed as follows: the inventory source, the availability cache source and the AVS.

Availability cache source: a source of availability information usually of lower confidence than the inventory source but with lower usage cost. Such caches may be fed with results obtained from past availability requests. A first user request and the corresponding reply can thus be re-used in response to another request of a second user. In some cases the cache is first built from responses to pro-active requests, i.e.: requests automatically created at server side.

Polling: a query sent to the inventory source for replying to a user request.

Statistical Indicator: a first statistical indicator may be a polling error rate which represents a ratio between a number of access failures and a number of access attempts to a given data source; a second statistical indicator may be a look-to-book number which indicates the average number of availability requests for making a conversion into a booking; a third statistical indicator may be a number of writes;

Order value: a numerical value between 0% and 100%. The order value may be an access attempt rate to the inventory source.

Decision rule: The decision rule may be based on request input parameters (originator, origin & destination, etc . . . ) and system parameters, such as the order value. Depending on the values of all these parameters, the rule defines a decision to which data source a request is directed.

Data source adaptation method: includes detecting a difference between a current value of a statistical indicator and a target value of the statistical indicator and calculating an order value dependent on the detected difference;

Data source selection rule: for selecting a data source among at least two data sources, may be part of the decision rule. The data source selection rule may also be a function of at least one characteristic of an availability request, such as the originator of the availability request or a parameter of the availability request, such as a market (it can be a journey origin and/or a destination, or the airline code of the provider in the travel industry) or a time frame indicated by the request.

Classically, decision rules and data source selection rules have been static as they e.g. were modifiable only in a manual way or within certain, predetermined time intervals (such as once every 24 hours). Very simple examples of such a decision rule/data source selection rule providing a decision basis for routing a request to one of two available data source could look as follows:

Availability requests (e.g. for online travel agencies or airline website etc.) indicating a travel start time within the next seven days are directed to the inventory source to a percentage of 70%.

Availability requests indicating a travel start time within the next eight to 30 days and further in the future are directed to the cache source to a percentage of 80.

Availability requests indicating a travel start time in 31 days from now and further into the future are always directed to the cache source (i.e. to 100%).

Availability requests indicating domestic flights are directed to the inventory source to a percentage of 60%, the remaining 40% to the base inventory source.

Note that rules could exist which only specify a proportion of requests to be directed to a particular data source and do not specify a further distribution of the remaining requests (cf. the first three examples). Other rules may also define to which data source the remaining requests shall be directed (cf. the last example).

Thus, although these classical decision rules/data source selection rules could have defined a stochastic distribution of requests to the various data sources, the request routing achieved by them is of static nature without the application of the mechanism described in the following.

Figure 1:
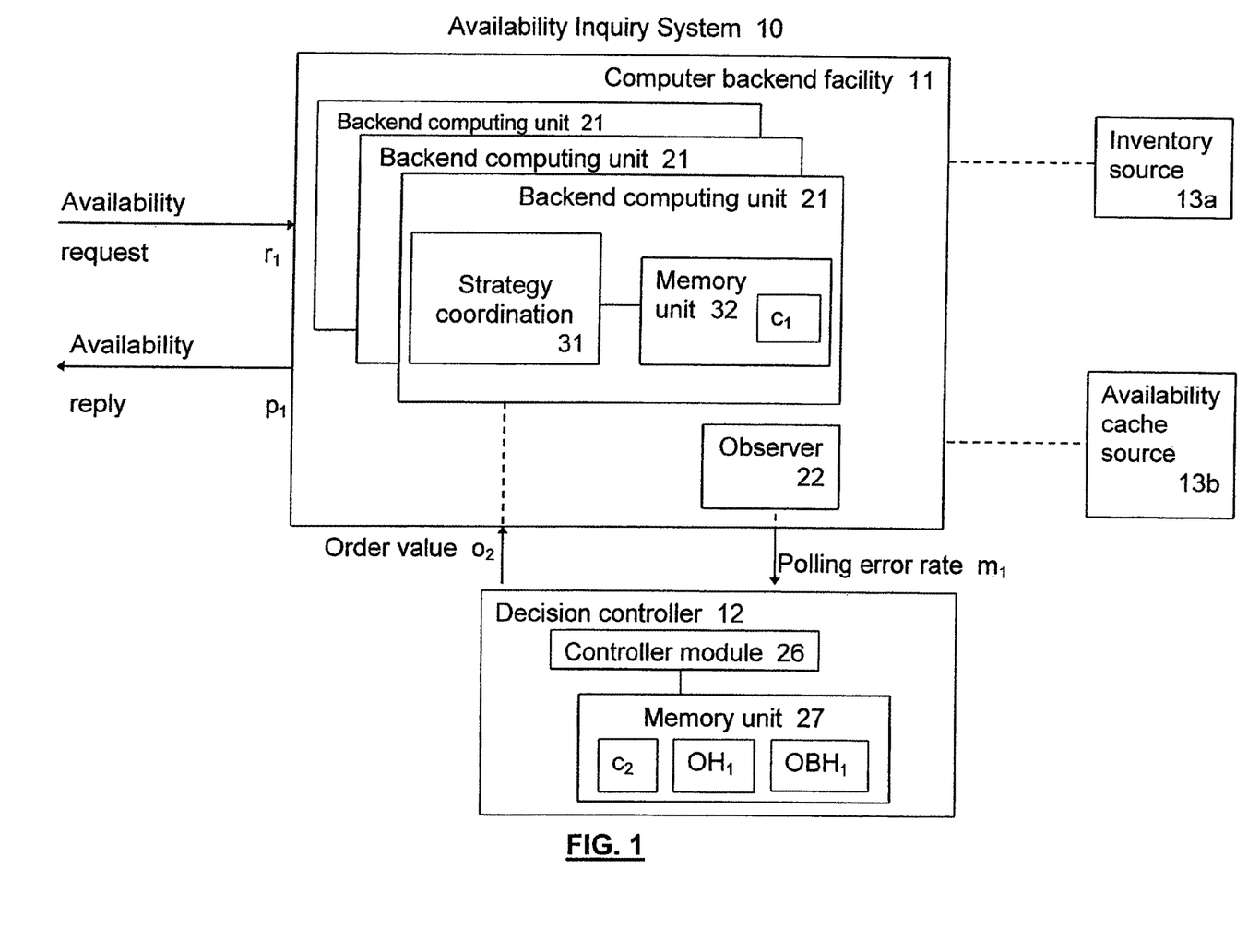
FIG. 1 is an example of an architecture diagram of an availability inquiry system according to a first non limiting embodiment of the present invention.
Figure 2:
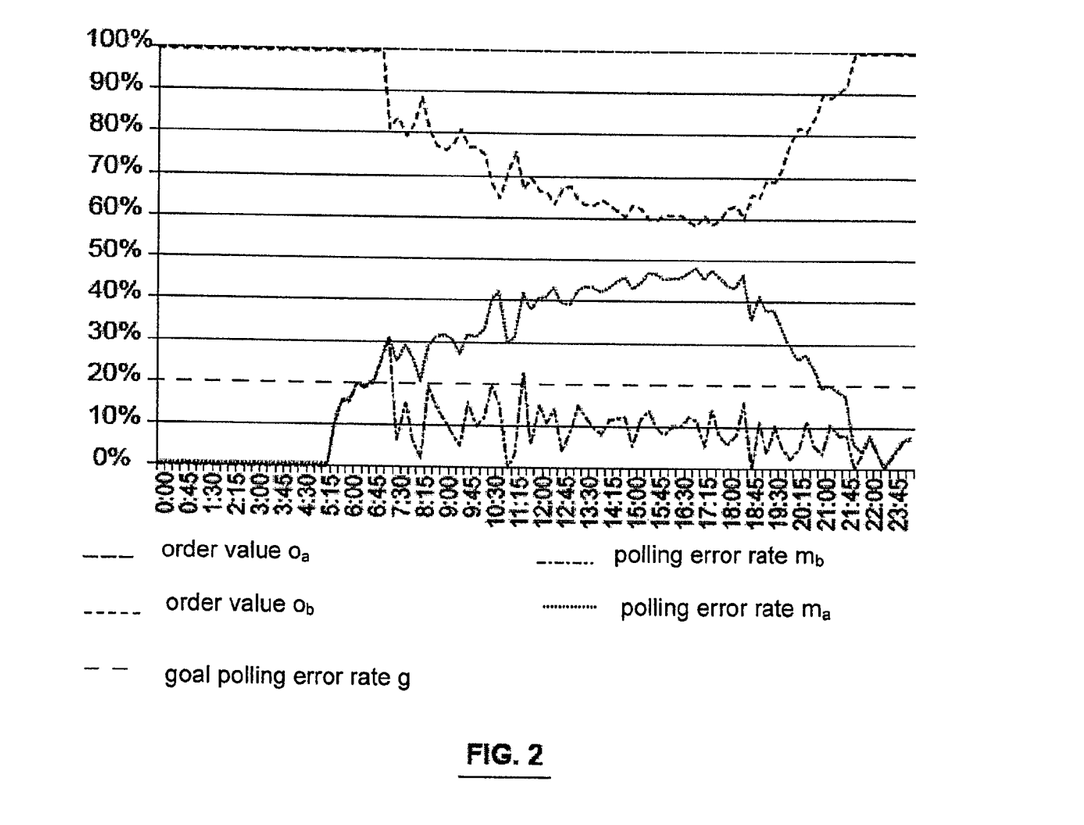
FIG. 2 is a linear graph presenting the values of polling error rates $m_a$ and $m_b$, a polling error threshold rate g, and order values $o_a$ and $o_b$.

FIGS. 1 and 2 give an example of a first embodiment of the invention. In the embodiment, a polling error rate of an inventory source is monitored and utilized to drive a decision process on how to use the inventory source. Further embodiments of the invention are depicted in FIGS. 3 through 6. The embodiments can be combined with each other.

FIG. 1 is an example of an architecture block diagram of an availability inquiry system 10 according to the present invention. In the present embodiment, after receiving a computation inquiry, which is here an availability request $r_1$, the availability inquiry system 10 can dynamically choose one from at least two data sources and retrieve the corresponding data from the chosen data source by applying a data source adaptation method to compute a decision rule. The data source adaptation method requires a polling error rate of an inventory source as an input data. The polling error rate represents a ratio between a number of access failures and a number of access attempts to a given data source. It is used as a statistical indicator.

The availability inquiry system 10 comprises a computer backend facility 11, a decision controller 12, and two data sources, an inventory source 13a and an availability cache source 13b, respectively. Such data sources are purely indicative and the invention applies to any data sources. In the present embodiment, the given data source is the inventory source 13a. All data sources are utilized for providing a storage space to (at least temporarily) store data relating to the seat availability. The computer backend facility 11 can be implemented by a computer cluster consisting of a set of loosely connected computers, or only by a single computing device. In the present embodiment, the computer backend facility 11 is coupled to the decision controller 12 and the data sources 13a and 13b, respectively.

The computer backend facility 11 is utilized for executing a decision process upon receipt of an availability request $r_1$. It comprises at least one backend computing unit 21 and an observer 22. The observer 22 is utilized for periodically generating and sending a latest polling error rate $m_1$ to the decision controller 12. Observer 22 thus monitors the statistical indicator. The polling error rate $m_1$ is a ratio between a number of failures in retrieving data from the inventory source 13a and a total number of access attempts to the said inventory source 13a. It thus reflects the access efficiency performed for the inventory source 13a.

The backend computing unit 21 comprises a strategy coordinator 31 and a memory unit 32. The memory unit 32 is coupled to the strategy coordinator 31. The memory unit 32 is utilized for storing at least a configuration file $c_1$ containing at least the decision rule. The strategy coordinator 31 is utilized for executing the decision rule.

The decision controller 12 comprises a controller module 26 and a controller memory unit 27. The controller module 26, coupled to the memory unit 27, is utilized for generating an order value $o_2$ which is between 0% and 100%. An order value, for example the order value $o_2$, is defined as an access attempt rate to the inventory source 13a. The memory unit 27 stores at least a second configuration file $c_2$, an order history file $OH_1$ and an observation history file $OBH_1$. The second configuration file $c_2$ contains a polling error threshold rate g that is the highest acceptable inventory access failure rate, predefined by the system administrator for example. In the present embodiment, the polling error threshold rate g is set to be 20%. In addition, the decision controller 12 gathers the updated values of the polling error rate $m_1$ at regular intervals preferably of a length under 5 minutes from the observer 22.

It should be noted that in other embodiments, the configuration files $c_1$ and $c_2$, the order history file $OH_1$ and the observation history file $OBH_1$ can be stored in a same memory unit, or in different memory units other than the memory unit 32 or the memory unit 27. Also the decision controller 12 and the computer backend facility 11 may share some hardware and/or software resources.

The computer backend facility 11 executes a decision process in order to reach (but not exceed) the order value $o_2$, and switches from the inventory source 13a (the main data source) to the availability cache source 13b in order to keep the polling error rate of the inventory source 13a not greater than the polling error threshold rate g.

The decision process requires data computed by the decision controller 12. The controller module 26 determines the order value $o_2$ according to information provided by the observer 22, the configuration $c_2$ and the observation history file $OBH_1$ stored in the memory unit 27. The detailed description about the data source adaptation method will be included in the following paragraphs.

The decision controller 12 is utilized for computing the updated order value $o_2$ related to the inventory source 13a. It periodically obtains the updated polling error rate $m_1$ provided by the observer 22, and the previous order value $o_1$ stored in the observation history file $OBH_1$. It then detects a difference between the polling error rate $m_1$ and the polling error threshold rate g provided by the configuration file $c_2$. The decision controller 12 generates the order value $o_2$ by applying a first response function which will be presented in the following paragraphs.

There are three cases of the value comparison between the polling error rate $m_1$ and the polling error threshold rate g:

The polling error rate $m_1$ is equal to the polling error threshold rate g: The computer backend facility 11 remains to access to the inventory source 13a as before and doesn't need to change the order value that will be applied to decision rules.

The polling error rate $m_1$ is smaller than the polling error threshold rate g: It means that the number of data retrieving requests received by the inventory source 13a is less than its maximum capacity of access. The computer backend facility 11 can more access to the inventory source 13a. The updated order value $o_2$ is greater than the previous order value $o_1$.

The polling error rate $m_1$ is bigger than the polling error threshold rate g: It means that the number of data retrieving requests received by the inventory source 13a is already greater than its maximum capacity of access. The updated order value $o_2$ is less than the previous order value $o_1$.

As mentioned above, the controller module 26 generates the order value $o_2$ by applying the first response function which calculates on the previous order value $o_1$, the polling error threshold rate g, the history of order values (recorded in $OH_1$) and the history of observations (recorded in $OBH_1$). The first response function can be presented as, but not limited to, the following example formula: $o_2 = o_1 \times e^{(g-m_1)}$ The generated order value $o_2$ is further regulated if one of the following conditions occurs:

If the updated order value $o_2$ is greater than 100%, the updated order value $o_2$ is set to be 100%.

If the updated order value $o_2$ is smaller than a predefined minimum order value, the updated order value $o_2$ is set to be the minimum order value stored in the configuration file $c_2$.

The controller module 26 stores the order value $o_2$ to the order history file $OH_1$. The order value $o_2$ will become the new value of the order value $o_1$ utilized in the next computation.

After receiving the updated order value $o_2$, the backend computing unit 21 re-computes the decision rule. The decision rule includes a data source selection rule for determining the data source among the inventory source 13a and the availability cache source 13b for retrieving data to be used for the availability request $r_1$. In all embodiments, the data source selection rule may be also a function of at least one characteristic of an availability request, such as the originator of the availability request or a parameter of the availability request, such as a market (it can be a journey origin and/or a destination, or the airline code of the provider in the travel industry.)

The detailed description about updating the data source selection rule given the updated order value $o_2$ is provided as follows:

If the updated order value $o_2$ is greater than the previous order value $o_1$, the data source selection rule is updated with a higher level of access, based on the rules stored in the configuration file $c_1$. Said stored rules will take the updated order value $o_2$ and some characteristics of the request $r_1$ (eg: airline, product) which will be sent to the chosen data source to use. Updating a rule by applying the updated order value $o_2$ is, for example, performed by replacing the percentage indication in the rule with the updated order value $o_2$. E.g., if the rule stipulated that availability requests indicating a travel start time within the next seven days shall be directed to the inventory source to a percentage of 70% and the updated order value $o_2$ has been set to 85%, the updated rules stipulates that availability requests indicating a travel start time within the next seven days shall be directed to the inventory source to a percentage of 85%.

If the updated order value $o_2$ is smaller than the previous order value $o_1$, it means that the inventory source $13a$ previously got too many data retrieving requests, relative to its maximum capacity of access. The computer backend facility 11 needs to lower down the order value from the value $o_1$ to the value $o_2$ to reduce the polling error rate of the inventory $13a$ and the data source selection rule is updated with a lower level of access. If the updated order value $o_2$ lowers and is close to 0, the computer backend facility 11 will be guided by the data source selection rule and thus switch to retrieve data from the availability cache source $13b$ to process the largest part of the requests.

After obtaining necessary data retrieved from the chosen data source, the computer backend facility 11 generates an availability reply $p_1$ corresponding to the availability request $r_1$.

The above re-computed decision rule is stored in real-time in the configuration file $c_1$. The updating of the configuration file $c_1$ can be executed independently from applying the configuration file $c_1$ for any availability requests received by the computer backend facility 11. Furthermore, it should be noted that in other embodiments, in addition to the inventory source $13a$ and the availability cache source $13b$, the availability inquiry system 10 may comprise more than two data sources, such as an AVS source. In this case, if the availability cache source is selected but it is empty or it does not answer in time, the AVS source will be selected. In addition, there can be a plurality of polling sources selected among a dynamic availability polling source, a direct access polling source and an availability calculator source.

In an embodiment with at least three data sources, two decision rules may be implemented which constitute the decision base for the data source selection in a hierarchical way. The first decision rule defines a probability that the first data source is chosen. The second decision rule defines the decision whether to select the second data source or the third data source of the three data sources. The same order value may be used for the two decision rules in a recursive manner. Alternatively, the statistical indicator and/or the order value $o_2$ may be used to compute a further order value used for the second decision rule.

For example, the first order value $o_2$ applied to the first decision rule being located at the first hierarchy level may be set to 70%. Thus, e.g. only 70% of incoming requests will be routed to a first polling data source while the remaining 30% of incoming requests are not directed to the first polling data source. At the second level of hierarchy, the same or another order value is applied to the second decision rule for taking a routing decision between two further data sources. The two further data sources may be a cache data source and an AVS data source. The further order value may e.g. be set to 90%. In that case, 90% of the remaining 30% of incoming requests are routed to the cache data source while the other incoming requests (10% of the remaining 30% of incoming requests) are routed to the AVS data source.

Turning now to FIG. 2, FIG. 2 is a linear graph presenting the values of polling error rates $m_a$ and $m_b$, a polling error threshold rate g, and order values $o_a$ and $o_b$ over time. The polling error rate $m_a$ and the order value $o_a$ are recorded without the execution of the data source adaptation method. During 9.45 h and 20.15 h the polling error rate $m_a$ is over 30%. During 13.00 h and 18.45 h the polling error rate $m_a$ is even over 40%. The polling error rate $m_b$ and the order value $o_b$ are recorded during the execution of the data source adaptation method according to the present invention.

During the observation period, by executing the data source adaptation method, the availability inquiry system 10 efficiently reduces the polling error rate of the inventory source $13a$ from the value $m_a$ to the value $m_b$. Polling error rate $m_b$ stays mostly under 20% and thus steadily approximates the polling error threshold rate g which is set in this example to 20%. In addition, the order value performed for the inventory source $13a$ is reduced from the value $o_a$ to the value $o_b$ because the availability inquiry system 10 adjusts in real-time the number of access attempts to the inventory source $13a$ by dynamically computing the order value of the inventory source $13a$ when receiving new observations of the statistical indicator e.g. performed by observer 22. The statistical indicator used in this embodiment is the polling error rate.

Figure 3:
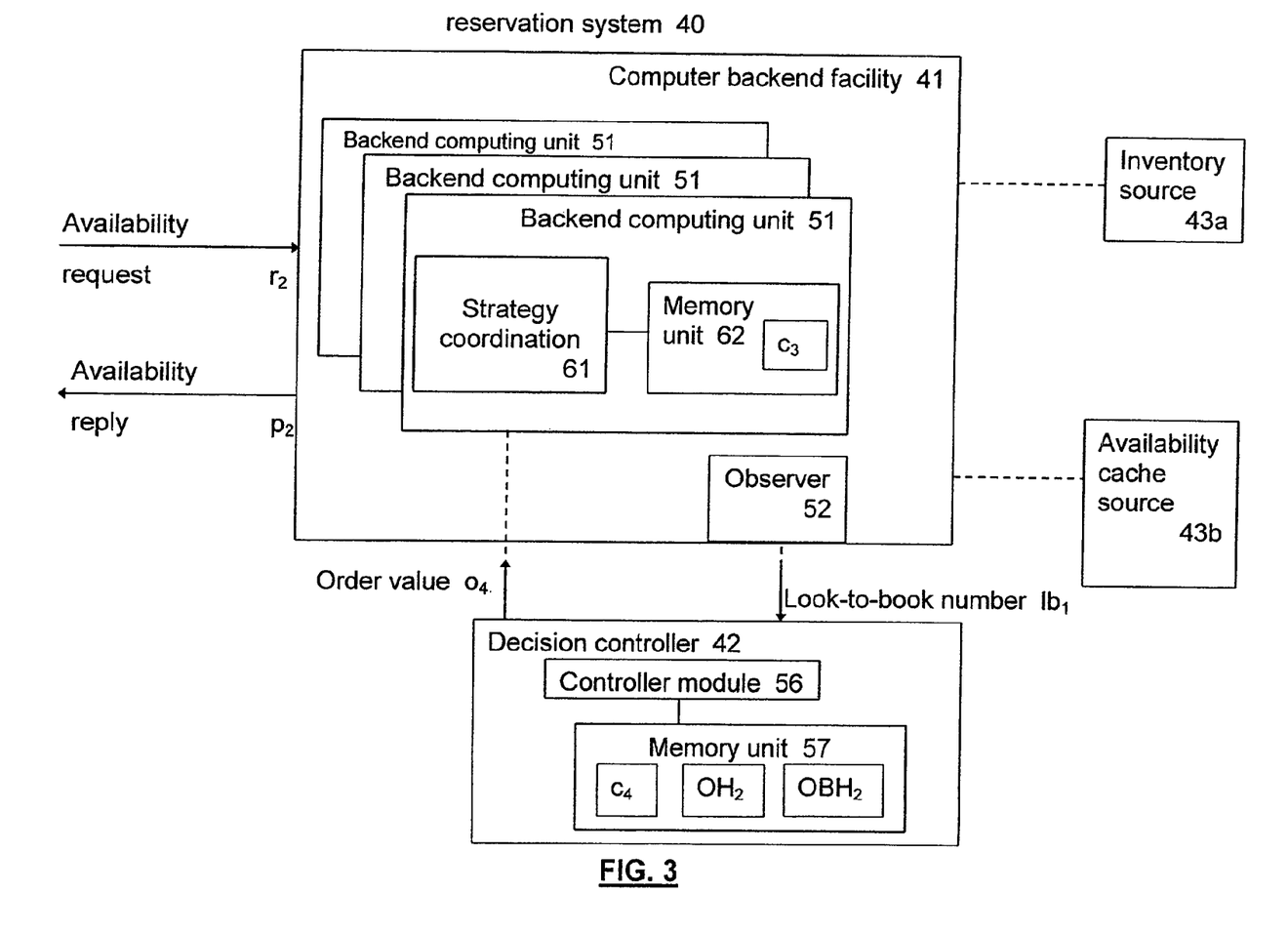
FIG. 3 is an example of an architecture block diagram of a reservation system 40 according to a second non limiting embodiment of the present invention.

FIG. 3 shows another embodiment where look-to-book considerations are used to drive the decision process. FIG. 3 is an example of an architecture block diagram of a reservation system 40 according to the present invention. The structure of the reservation system 40 and its functions are similar to those of the above-mentioned availability inquiry system 10 of the above-mentioned embodiment. However, the decision process executed by the reservation system 40 requires a look-to-book number as an input data to be used as a statistical indicator. While retrieving data from an inventory source $43a$, the look-to-book number indicates the average number of availability requests received by the reservation system 40 involving an access to a given data source for making a conversion into a booking (eg, a seat reservation). An example of 700 "looks" for 1 "book" is used below.

In the present embodiment, after receiving an availability request $r_2$, the reservation system 40 can dynamically choose one from at least two data sources and retrieve the corresponding data from the chosen data source by applying a data source adaptation method to compute a decision process.

The reservation system 40 comprises a computer backend facility 41, a decision controller 42, and two data sources, an inventory source $43a$ and an availability cache source $43b$, respectively, such data sources are purely indicative and the invention applies to any data source. In the present embodiment, the given data source or in other words the preferred data source or the most reliable data source is the inventory source 43a. The computer backend facility 41 is coupled to the decision controller 42 and the data sources 43a and 43b, respectively.

The computer backend facility 41 is utilized for executing a decision process upon receipt of an availability request $r_2$. It comprises at least one backend computing unit and an observer 52. The observer 52 is utilized for periodically generating and sending a latest look-to-book number $lb_1$ to the decision controller 42. To generate a look-to-book number observer 52 monitors the data access to the data sources. The smaller the look-to-book number $lb_1$ is, the more orders can be processed by retrieving the corresponding data from the inventory source 43a, while keeping a given inventory source usage efficiency. A small look-to-book number reflects a good efficiency of the inventory source since its access rate is low compared to the conversion of availability requests into bookings. (A look-to-book conversion rate takes into account only the looks to the inventory source 43a against the bookings made by the reservation system 40.)

The backend computing unit 51 comprises a strategy coordinator 61 and a memory unit 62. The memory unit 62 is coupled to the strategy coordinator 61. The memory unit 62 is utilized for storing at least a configuration file $c_3$ containing at least the decision rule. The strategy coordinator 61 is utilized for executing the decision rule.

The decision controller 42 comprises a controller module 56 and a controller memory unit 57. The controller module 56, coupled to the memory unit 57, is utilized for generating an order value $o_4$, which is between 0% and 100%. An order value, for example the order value $o_4$, is defined as an access attempt rate to the inventory source 43a. The decision controller 42 generates the order value $o_4$ by applying a second response function which will be presented in the following paragraphs.

The memory unit 57 stores at least a second configuration file $c_4$, an order history file $OH_2$ and an observation history file $OBH_2$. The second configuration file $c_4$ contains a goal look-to-book number lbg set by the system administrator to be 700 for example, and a look-to-book conversion rate is thus 700:1 in the present embodiment. In addition, the decision controller 42 gathers the updated values of the look-to-book number $lb_1$ at regular intervals of a length under 5 minutes from observer 52. The decision controller 42 further computes a global look-to-book conversion rate which is computed as an integration starting at a given point in time, for example, the start of a day.

It should be noted that in other embodiments, the configuration files $c_3$ and $c_4$, the order history file $OH_2$ and the observation history file $OBH_2$ can be stored in a same memory unit, or in different memory units other than the memory unit 62 or the memory unit 57.

The computer backend facility 41 executes a decision process in order to reach the order value $o_4$. The computer backend facility 41 switches from the inventory source 43a (the main data source) to the availability cache source 43b in order to keep the look-to-book number of to the inventory source 43a to be not greater than the goal look-to-book number lbg.

The decision process requires data computed by the decision controller 42. The controller module 56 determines the order value $o_4$ according to information provided by the observer 52, the configuration $c_4$ and the observation history file $OBH_2$ stored in the memory unit 57. The detailed description about the data source adaptation method will be included in the following paragraphs.

The decision controller 42 is utilized for computing the updated order value $o_4$ related to the inventory source 43a. It periodically obtains the updated look-to-book number $lb_1$ provided by the observer 52, and the previous order value $o_3$ stored in the order history file $OH_2$. It then detects a difference between the look-to-book number $lb_1$ and the goal look-to-book number lbg provided by the configuration file $c_4$.

There are three cases of the value comparison between the look-to-book number $lb_1$ and the goal look-to-book number lbg:

The look-to-book number $lb_1$ is equal to the goal look-to-book number lbg: The computer backend facility 41 remains to access as before to the inventory source 43a and doesn't need to change the order value that will be applied to the decision rules. However, if more orders are to be made, the computer backend facility 41 switches to access to the availability cache source 43b for retrieving data.

The look-to-book number $lb_1$ is smaller than the goal look-to-book number lbg: The computer backend facility 41 can thus continue accessing to the inventory source 43a for retrieving data. The updated order value $o_4$ is greater than the previous order value $o_3$.

The look-to-book number $lb_1$ is bigger than the goal look-to-book number lbg: It means that currently for making a conversion into a booking, the inventory source 43a already receives too many data retrieving requests. The computer backend facility 41 switches thus more frequently to access to the availability cache source 43b for retrieving data. The updated order value $o_4$ is less than the previous order value $o_3$.

As mentioned above, the controller module 56 generates the updated order value $o_4$ by applying the second response function which calculates on the previous order value $o_3$, the goal look-to-book number lbg, the history of order values (recorded in $OH_2$) and the history of observations (recorded in $OBH_2$). The second response function can be presented as, but not limited to, the following example formula: $o_4 = o_3 \times e^{(lbr_1 - lgbr)}$, wherein the variable lgbr is a ratio calculated based on the goal look-to-book number lbg while the variable $lbr_1$ is a ratio calculated based on the look-to-book number $lb_1$.

Like the order value $o_2$ of the availability inquiry system 10, the order value $o_4$ is then regulated if one of the following conditions occurs:

If the updated order value $o_4$ is greater than 100%, the updated order value $o_4$ is set to be 100%.

If the updated order value $o_4$ is smaller than a predefined minimum order value, the updated order value $o_4$ is set to be the minimum order value stored in the configuration file $c_{21}$.

The controller module 56 stores the order value $o_4$ to the order history file $OH_2$, which will become the new value of the order value $o_3$ utilized in the next computation.

After receiving the updated order value $o_4$, the backend computing unit 51 re-computes the decision rule, including a data source selection rule for determining the data source among the inventory source 43a and the availability cache source 43b for retrieving data to be used for the availability request $r_2$. The data source selection rule may also be a function of at least one characteristic of the availability request.

After obtaining necessary data retrieved from the chosen data source, the computer backend facility 41 generates an availability reply $p_2$ corresponding to the availability request $r_2$.

The above re-computed decision rule is stored in real-time in the configuration file $c_3$. The updating of the configuration file $c_3$ can be executed independently from applying the configuration file $c_3$ for any availability requests received by the computer backend facility 41.

Furthermore, it should be noted that in other embodiments, in addition to the inventory source 43a and the availability cache source 43b, the reservation system 40 may comprise more than two data sources, such as an availability status source. In addition, there can be a plurality of polling sources selected among a dynamic availability polling source, a direct access polling source and an availability calculator source. Then, a decision rules/second data source selection rule may be implemented to determine recursively the second data source to be accessed.

As already outlined above, in an embodiment comprising a further data source such as the availability status source, a second decision rule/data source selection rule may be implemented to decide about data access at a second hierarchy level of data sources in a recursive way. Thus, a first decision rule is used to determine whether or not a certain request is directed to a certain data source at a first hierarchy level, for example the inventory source 43a. If it is decided that the request is not to be directed to this first-hierarchy-level data source, recursively, a routing decision concerning the request is taken at a second hierarchy level of data sources, e.g. whether to direct it to the availability cache source 43b or the availability status source. To this end, a second rule is utilized which is potentially being updated by another order value in the same fashion than the first rule. In the same way, a decision rule may be implemented in recursive form for a decision between a plurality of polling sources. Thus, the request routing mechanisms may be employed at a plurality of data source hierarchy levels in the same manner.

Figure 4:
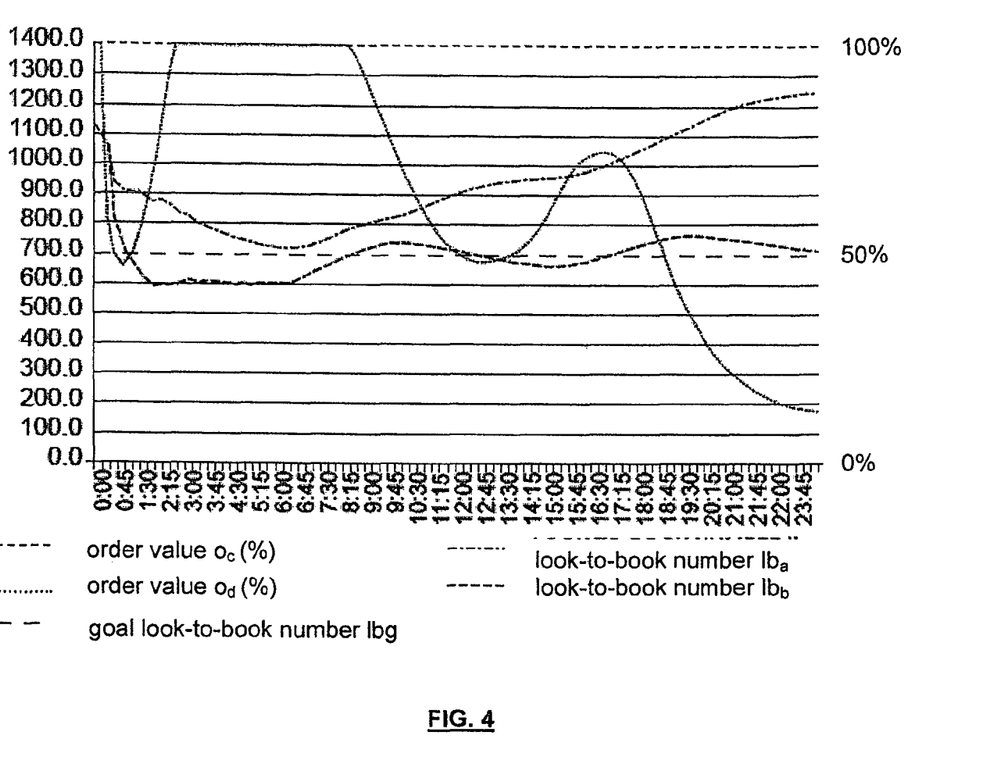
FIG. 4 is a linear graph presenting the values of look-to-book numbers $lb_a$ and $lb_b$, a goal look-to-book number lbg, and order values $o_c$ and $o_d$.

FIG. 4 is a linear graph presenting the values of look-to-book numbers $lb_a$ and $lb_b$, a goal look-to-book number lbg, and order values $o_c$ and $o_d$ over time. The look-to-book number $lb_a$ and the order value $o_c$ are recorded without the execution of the data source adaptation method. The look-to-book number $lb_b$ and the order value $o_d$ are recorded with the execution of the data source adaptation method according to the present invention.

By executing the data source selection rule update process according to the present invention, the reservation system 40 makes the look-to-book number corresponding to the inventory source 43a approximate to the goal look-to-book number lbg at the end of each aggregation period (such as a daily integration), in order to adjust in real-time the number of access attempts to retrieving data from the inventory source 43a.

This is illustrated by FIG. 4: the order value $o_d$ is increased when the look-to-book number $lb_b$ falls under the goal look-to-book number lbg at about 12.45 h. The order value $o_d$ is decreased again when the look-to-book number $lb_b$ rises above goal look-to-book number lbg at about 17.15 h.

Figure 5:
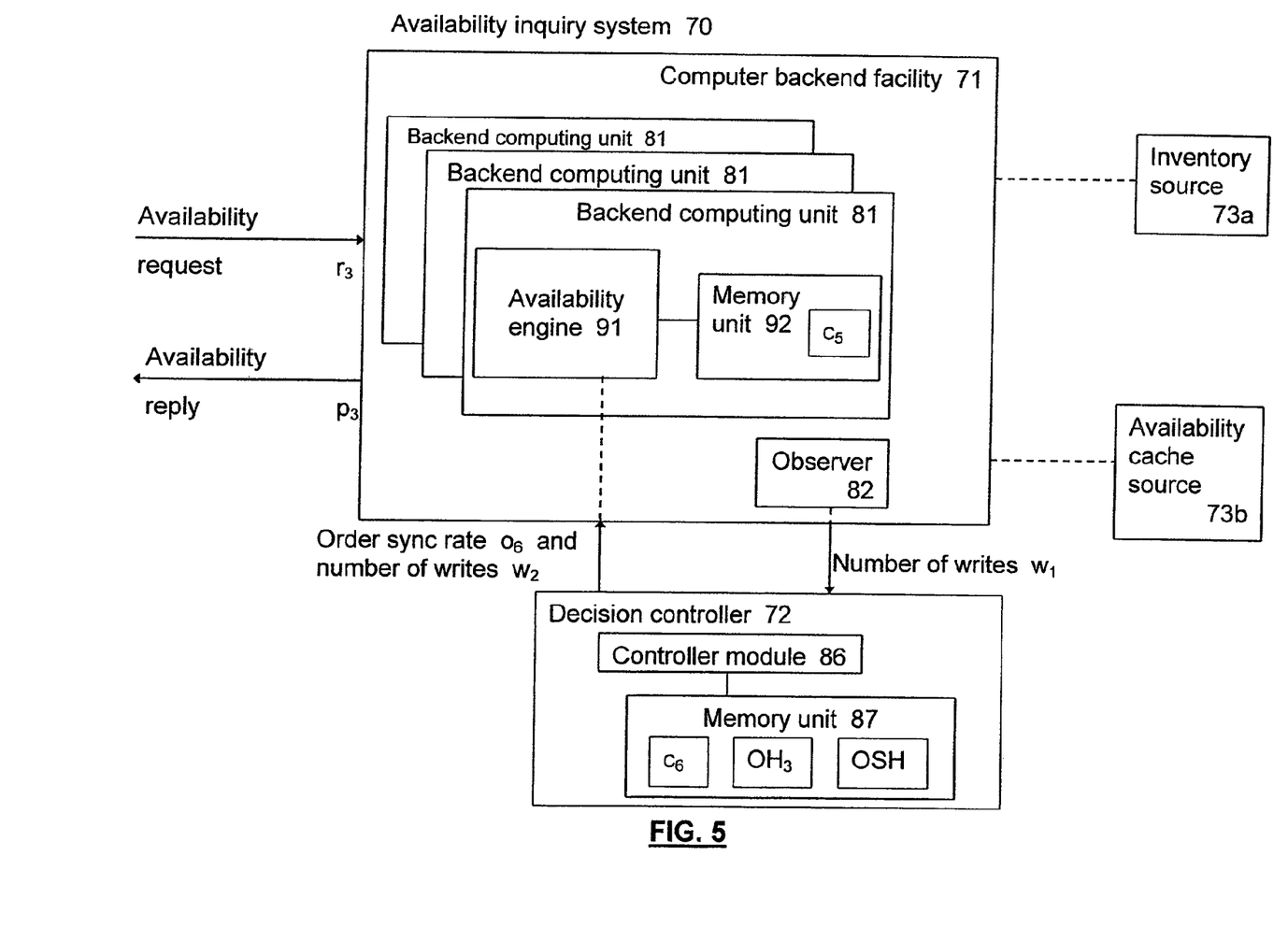
FIG. 5 is an example of an architecture block diagram of an availability inquiry system 70 according to a third non limiting embodiment of the present invention.

FIG. 5 is an example of an architecture block diagram of an availability inquiry system 70 according to the present invention. In the present embodiment, after receiving an availability request $r_3$, the availability inquiry system 70 retrieves availability data from at least two data sources to generate an availability reply $p_3$ corresponding to the availability request $r_3$. It further executes a data sync method to keep the data consistency among the data sources, one of which is here an availability cache source 73b. The decision process requires a number of writes $w_1$ of the availability cache source 73b as an input data, which is used as a statistical indicator.

The availability inquiry system 70 comprises a computer backend facility 71, a decision controller 72, and two data sources, an inventory source 73a and a cache database 73b, respectively. Such data sources are purely indicative and the invention applies to any data sources. The computer backend facility 71 is coupled to the decision controller 72 and the data sources 73a and 73b, respectively.

The computer backend facility 71 is utilized for executing a data sync method to update data stored in the availability cache source 73b. It comprises at least one backend computing unit 81 and an observer 82. The observer 82 is utilized for periodically sending a latest number of writes $w_1$, performed for the availability cache source 73b, to the decision controller 72. The detailed description about the data sync method will be included in the following paragraphs.

The backend computing unit 81 comprises an availability engine 91 and a memory unit 92. The memory unit 92 is coupled to the availability engine 91. The memory unit 92 is utilized for storing at least a configuration file $c_5$ containing at least a decision rule. The availability engine 91 is utilized for executing the decision rule by applying an order sync rate $o_6$, which represents a percentage of updated availability data to be replicated from the inventory source 73a to the availability cache source 73b.

The decision controller 72 comprises a controller module 86 and a controller memory unit 87. The controller module 86, coupled to the memory unit 87, is utilized for generating the order sync rate $o_6$. The memory unit 87 stores at least a second configuration file $c_6$, an order history file $OH_3$ and an observation history file $OBH_3$. The second configuration file $c_6$ contains a goal number of writes wg set by the system administrator. The goal number wg may be, for instance, a maximum capacity of access to the availability cache source 73b. In the present embodiment, the goal number of writes wg is set to be 500,000. In addition, the decision controller 72 gathers the updated values of the number of writes $w_1$ at regular intervals preferably of a length under 5 minutes.

It should be noted that in other embodiments, the configuration files $c_5$ and $c_6$, the order sync history file OSH and the observation history file $OBH_3$ can be stored in a same memory unit, or in different memory units other than the memory unit 92 or the memory unit 87. Also the decision controller 72 and the computer backend facility 71 may share some hardware and/or software resources.

The computer backend facility 71 executes a decision process in order to reach (but not exceed) the order sync rate $o_6$. The decision process requires data computed by the decision controller 72. The decision controller 72 is utilized for computing the order sync rate $o_6$. It periodically obtains the updated number of writes $w_1$ provided by the observer 82, and the previous order sync rate $o_5$ stored in the order sync history file OSH. It then detects a difference between the number of writes $w_1$ and the goal number of writes wg provided by the second configuration file $c_6$.

The controller module 86 generates the updated order sync rate $o_6$ based on a third response function which calculates on the goal number of writes wg and the number of writes $w_1$, and stores the order sync rate $o_6$ to the order sync history file OSH. The third response function is presented as, but not limited to, the following formula:

$$o_6 = \frac{wg}{w_1}.$$

The controller module 86 also provides the order sync rate $o_6$ to the computer backend facility 71 to ensure that the availability cache source 73b will not exceed its maximum capacity of access.

There are three cases of the value comparison between the number of writes $w_1$ and the goal number of writes wg:

The number of writes $w_1$ is equal to the goal number of writes wg: The computer backend facility 71 remains at the same sync rate $o_6$ to replicate updated availability data from the inventory source 73a to the availability cache source 73b. The number of writes $w_2$ is set to be the value of the goal number of writes wg.

The number of writes $w_1$ is bigger than the goal number of writes wg: The number of writes performed for the availability cache source 73b may be greater than its maximum capacity of access. It means that the computer backend facility 71 needs to reduce data replication writes from the inventory source 73a to the availability cache source 73b. The number of writes $w_2$ is set to be the value of the goal number of writes wg.

The number of writes $w_1$ is smaller than the goal number of writes wg: It means that the computer backend facility 71 can perform more data replication writes from the inventory source 73a to the availability cache source 73b. The number of writes $w_2$ is set to be the value of the number of writes $w_1$.

After receiving the updated order sync rate $o_6$, the computer backend facility 71 re-computes the decision rule, including a cache write throttling rule.

Figure 6:
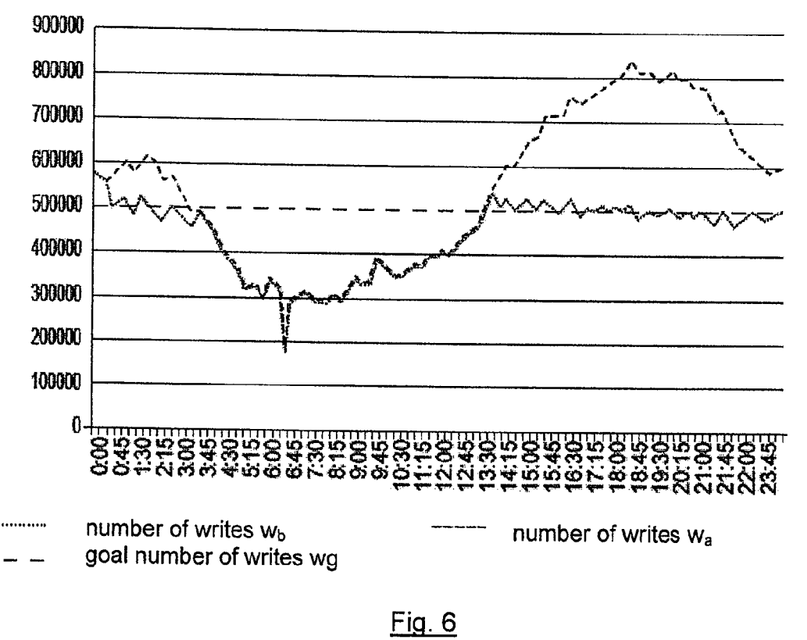
FIG. 6 is a linear graph presenting the values of numbers of writes $w_a$ and $w_b$, and a goal number of writes wg.

Turning now to FIG. 6, FIG. 6 is a linear graph presenting the values of numbers of writes $w_a$ and $w_b$, and a maximum number of writes wg over time. The number of writes $w_a$ is recorded without the execution of the data sync method. The number of writes $w_b$ is recorded with the execution of the data sync method according to the present invention. In addition, during the observation period, by executing the data sync method, the availability inquiry system 70 efficiently reduces the write overload of the availability cache source 73b.

According to the example shown in FIG. 6, between about 3.30 h and about 13.30 h, the number of writes $w_a$ is always under the maximum number of writes wg. Therefore, $w_b$ is equal $w_a$. During the time before 3.30 h and after 13.30, the number of writes $w_a$ is always above the maximum number of writes wg. Therefore, $w_b$ is set to wg.

Exemplary embodiments of the invention are summarized hereafter; they can each be used independently or in combination with at least another exemplary embodiment of the invention:

An embodiment may comprise using the configuration file for any computation inquiry received by the computer backend machine independently from the updating of the configuration file.

The at least one decision rule may comprise a data source selection rule providing a logic configured to determine a data source among plural data sources accessible for retrieving data to be used for the computation inquiry.

The data source selection rule may be a function of at least one characteristic of the computation inquiry.

The computation inquiry may be a flight availability computation inquiry, and the data source selection rule is an availability data source selection rule, and the plural data sources comprise at least two of: a polling source, an availability status source (AVS), an availability cache source.

The plural data sources may comprise at least one polling source selected among a dynamic availability polling source, a direct access polling source and an availability calculator source. A ratio between a number of failures in retrieving data from the polling source and a total number of access attempts to said polling source is used as statistical indicator for determining the availability data source selection rule.

The plural data sources may comprise at least one polling source selected among a dynamic polling source, a direct access polling source and an availability calculator source. A look-to-book ratio of an originator of the computation inquiry is used as statistical indicator for determining the availability data source selection rule.

The at least one decision rule may comprise a cache writing decision rule providing a logic of whether to write in an availability cache source a replication of data obtained from a remote data source such as an inventory source also called polling source.

The cache writing decision rule may be a function of at least one characteristic of the computation inquiry.

An embodiment may comprise using a number of cache writings as statistical indicator for determining the cache writing decision rule.

The computation inquiry may require the execution of a data read or write instruction in a data source and the decision process is for deciding on whether a given data source is to be accessed by the computer backend machine for the execution of the data read or write instruction.

An embodiment may comprise: 1) defining an order level of read or write instructions to be executed by the given data source; this order level may be a proportion of instructions to be sent by or to the given data source; and 2) computing the decision rule so as to reach or stay below the order level.

An embodiment may comprise, upon the updated value of the statistical indicator differing from the target value of the statistical indicator, computing an updated value of the order level based on the product of a current value of the order level with an exponential function of a difference between the target value of the statistical indicator and the updated value of the statistical indicator, and re-computing the decision rule so as to reach the updated value of the order level.

An embodiment may comprise periodically gathering the updated values of the statistical indicator at regular intervals of a length under 5 minutes.

An embodiment may comprise a computer program product stored in non-transitory computer-readable medium and comprising instructions adapted to perform the method of the invention.

An embodiment may comprise plural data sources accessible for retrieving data to be used for the computation inquiry and a network for bilateral communication between the computer backend machine and the plural data source.

An example 1 is a method which may comprise controlling the execution of a decision process by a computer backend machine of a computer network upon receipt of a computation inquiry, comprising:

associating to the computer backend machine a configuration file containing at least a decision rule that drives the decision process and that is computed at least from a current value of a statistical indicator and a target value of the statistical indicator;

periodically obtaining an updated value of the statistical indicator;

upon detection that the updated value is differing from the target value, dynamically updating the configuration file which further comprises:
re-computing the decision rule using the updated value as new current value;
storing in real-time the re-computed decision rule in the configuration file.

In an example 2 the subject matter of example 1 can optionally include using the configuration file for any computation inquiry received by the computer backend machine independently from the updating of the configuration file.

In an example 3, the subject matter of any one of examples 1 and 2 can optionally include that the at least one decision rule comprises a data source selection rule which is a function of at least one characteristic of the computation inquiry for providing a logic configured to determine a data source among plural data sources accessible for retrieving data to be used for the computation inquiry.

In an example 4, the subject matter of example 3 can optionally include that the computation inquiry is a flight availability computation inquiry, and where the data source selection rule is an availability data source selection rule, and where the plural data sources comprise at least two of: a polling source, an availability status source (AVS), an availability cache source.

In an example 5 the subject matter of any of examples 1-4 can optionally include that the plural data sources comprise at least one polling source selected among a dynamic availability polling source, a direct access polling source and an availability calculator source, and comprising using, as statistical indicator for determining the availability data source selection rule, a ratio between a number of failures in retrieving data from the polling source and a total number of access attempts to said polling source.

In an example 6 the subject matter of example 4 can optionally include that the plural data sources comprise at least one polling source selected among a dynamic polling source, a direct access polling source and an availability calculator source, the method comprising using, as statistical indicator for determining the availability data source selection rule, a look-to-book ratio of an originator of the computation inquiry.

In an example 7 the subject matter of example 4 can optionally include that the at least one decision rule comprises a cache writing decision rule providing a logic of whether to write in an availability cache source a replication of data obtained from a remote data source.

In an example 8 the subject matter of example 7 can optionally include that the cache writing decision rule, generated by a calculation using a number of cache writings as statistical indicator, is a function of at least one characteristic of the computation inquiry.

In an example 9 the subject matter of any of examples 1-8 can optionally include that the computation inquiry requires the execution of a data read or write instruction in a data source and where the decision process is for deciding on whether a given data source is to be accessed by the computer backend machine for the execution of the data read or write instruction.

In an example 10 the subject matter of example 9 can optionally include:
defining an order level of read or write instructions to be executed by the given data source;
computing the decision rule so as to reach or stay below the order level In an example 11 the subject matter of example 10 can optionally include upon the updated value of the statistical indicator differing from the target value of the statistical indicator, computing an updated value of the order level based on the product of a current value of the order level with an exponential function of a difference between the target value of the statistical indicator and the updated value of the statistical indicator, and re-computing the decision rule so as to reach the updated value of the order level.

In an example 12 the subject matter of any of examples 1-11 can optionally include periodically gathering the updated values of the statistical indicator is operated at regular intervals of a length under 5 minutes.

An example 13 is a computer program product stored in non-transitory computer-readable medium and comprising instructions adapted to perform the method of any of the examples 1-12.

An example 14 is a computerized system comprising at least one computer backend machine configured to execute a decision process upon receipt of a computation inquiry and comprising a configuration file containing at least a decision rule that drives the decision process and that is computed at least from a current value of a statistical indicator and a target value of the statistical indicator, the computerized system comprising a processor where operation of the processor in accordance with a computer program stored in a non-transitory computer-readable medium causes the computerized system to:
periodically obtaining an updated value of the statistical indicator;
upon detection that the updated value is differing from the target value, dynamically updating the configuration file which further comprises:
re-computing the decision rule using the updated value as new current value;
storing in real-time the re-computed decision rule in the configuration file.

In an example 15 the subject matter of example 15 can optionally include plural data sources accessible for retrieving data to be used for the computation inquiry and a network for bilateral communication between the computer backend machine and the plural data source.

The foregoing description has provided by way of exemplary and non-limiting examples a full and informative description of various methods, apparatus and computer program software for implementing the exemplary embodiments of this invention. However, various modifications and adaptations may become apparent to those skilled in the relevant arts in view of the foregoing description, when read in conjunction with the accompanying drawings and the appended claims. As but some examples, the use of other similar or equivalent processes or algorithms and data representations may be attempted by those skilled in the art. Further, the various names used for the different elements, functions and algorithms (e.g., etc.) are merely descriptive and are not intended to be read in a limiting sense, as these various elements, functions and algorithms can be referred to by any suitable names. All such and similar modifications of the teachings of this invention will still fall within the scope of the embodiments of this invention.

Furthermore, while described above primarily in the context of travel solutions provided by airlines (air carriers), those skilled in the art should appreciate that the embodiments of this invention are not limited for use only with airlines, but could be adapted as well for use with other types of travel modalities and travel providers including, as non-limiting examples, providers of travel by ship, train, motor-car, bus and travel products such as hotels.

Furthermore, some of the features of the exemplary embodiments of the present invention may be used to advantage without the corresponding use of other features. As such, the foregoing description should be considered as merely illustrative of the principles, teachings and embodiments of this invention, and not in limitation thereof.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network.

Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit and the scope of the embodiments of the invention.

The invention claimed is:

1. A method of distributing access requests among a plurality of data sources by a computer backend machine of a computer network, the method comprising:

providing a target value of a statistical indicator to the computer backend machine, wherein the statistical indicator is indicative of data accesses to a given data source among the plurality of data sources, and wherein at least two data sources among the plurality of data sources have different accuracy levels;

associating to the computer backend machine a decision rule associated with cache updates;

observing a current value of the statistical indicator by an observer of the computer backend machine;

dynamically re-computing the decision rule upon detecting that the observed current value of the statistical indicator differs from the target value of the statistical indicator; and distributing the access requests among the plurality of data sources with the computer backend machine based on the re-computed decision rule.

2. The method of claim 1, wherein the statistical indicator is one out of a polling error rate and a look-to-book number.

3. The method of claim 1, further comprising;

generating an order value for the data source having the highest accuracy level depending on the detected difference between the current value of the statistical indicator and the target value of the statistical indicator.

4. The method of claim 3, further comprising:

updating the order value when the detected difference indicates a change in the current value of the statistical indicator, wherein the updated order value is calculated depending on the previous order value and a history of order values.

5. The method of claim 1, wherein a first decision rule and a second decision rule are provided, wherein the first decision rule decides an access attempt rate for a first data source having the highest accuracy level out of the plurality of data sources and the second decision rule decides an access attempt rate for a second data source of a lower accuracy level out of the plurality of data sources when the first data source is not accessed.

6. The method of claim 1, further comprising:

a decision process adapted to decide access to one out of the plurality of data sources upon receipt of a computational inquiry based on the decision rule.

7. The method of claim 6, wherein the decision process is a function of at least one characteristic of the computational inquiry.

8. The method of claim 1, wherein the plurality of data sources comprise at least one polling source selected among a dynamic availability polling source, a direct access polling source and an availability calculator source.

9. The method of claim 1, wherein the plurality of data sources comprise at least two out of a polling source, an availability status source (AVS) and an availability cache source.

10. The method of claim 1, further comprising:

upon the updated value of the statistical indicator differing from the target value of the statistical indicator, computing an updated value of the order level based on the product of a current value of the order level with an exponential function of a difference between the target value of the statistical indicator and the updated value of the statistical indicator, and re-computing the decision rule so as to reach the updated value of the order level.

11. A computer program product stored in non-transitory computer-readable medium and comprising instructions adapted to perform the method of claim 1 upon execution by a processor of a computer backend machine of a computer network.

12. An availability inquiry system comprising at least one computer backend machine, the at least one computer backend machine comprising:
- a processor; and
- a computer-readable storage medium comprising instructions that upon execution by the processor cause the availability inquiry system to:
- obtain an updated value of a statistical indicator from an observer of the computer backend machine, wherein the statistical indicator is indicative of data accesses to a given data source among a plurality of data sources having different accuracy levels;
- dynamically re-compute a decision rule upon detecting that the updated value differs from a target value of the statistical indicator, the decision rule associated with cache updates; and
- retrieving availability data from the plurality of data sources to satisfy availability requests according to the re-computed decision rule.

13. The system of claim 12, wherein the statistical indicator is a polling error rate.

14. A reservation system comprising at least one computer backend machine, the at least one computer backend machine comprising:
- a processor; and
- a computer-readable storage medium comprising instructions that upon execution by the processor cause the reservation system to:
- obtain an updated value of a statistical indicator from an observer of the computer backend machine, wherein the statistical indicator is indicative of data accesses to a given data source among a plurality of data sources having different accuracy levels;
- dynamically re-compute a decision rule upon detecting that the updated value differs from a target value of the statistical indicator, the decision rule associated with cache updates; and
- modify a configuration of the computer backend machine with the re-computed decision rule to alter distribution of access requests by the computer backend machine.

15. The system of claim 14, wherein the statistical indicator is a look-to-book ratio.

* * * * *